United States Patent [19]

Lee et al.

[11] Patent Number: 4,575,179
[45] Date of Patent: Mar. 11, 1986

[54] INTEGRATED OPTICAL SIGNAL PROCESSOR USING DIFFRACTION OF LIGHT BY MAGNETOSTATIC WAVES

[75] Inventors: John N. Lee, Silver Spring, Md.; Arthur D. Fisher, Alexandria, Va.

[73] Assignee: The United States of America as represented by the Secretary of the Navy, Washington, D.C.

[21] Appl. No.: 546,757

[22] Filed: Oct. 28, 1983

[51] Int. Cl.[4] .............................................. G02B 6/12
[52] U.S. Cl. .............................. 350/96.13; 350/96.11; 350/162.12
[58] Field of Search ............... 350/96.11, 96.12, 96.13, 350/96.14, 162.12, 162.13, 162.14

[56] References Cited

U.S. PATENT DOCUMENTS

| | | | |
|---|---|---|---|
| 3,655,261 | 4/1972 | Chang | 350/96.13 |
| 4,110,016 | 8/1978 | Berg et al. | 350/96.13 X |
| 4,143,939 | 3/1979 | Desormiere et al. | 350/96.13 |
| 4,220,395 | 9/1980 | Wang et al. | 350/96.12 |
| 4,236,782 | 12/1980 | Castera et al. | 350/96.13 |
| 4,297,704 | 10/1981 | Marom et al. | 350/96.13 X |

OTHER PUBLICATIONS

J. N. Lee, A. B. Tveten; "Abstract-Signal Processing Using Optical Interaction with Magnetostatic Waves" Congress and Twelfth Assembly of the International Commission for Optics; Graz, Austria; Aug. 31-Sep. 5, 1981.

A. D. Fisher et al., "Diffraction of Guided Optical Waves in Magnetostatic Wave Delay Lines", reprinted from 1982 Ultrasonics Symposium, pp. 541-546.

Primary Examiner—John Lee
Attorney, Agent, or Firm—Robert F. Beers; William T. Ellis; John L. Forrest

[57] ABSTRACT

An integrated optical signal processor device. The device includes a thin film of yttrium iron garnet ferrite material formed on a gadolinium gallium garnet substrate. A guided optical beam in a first polarization mode is directed through the thin film. A stripline antenna formed on the surface of the thin film is coupled to receive a microwave RF input signal. Under the influence of a bias magnetic field, the RF input signal excites a magnetostatic wave in the thin film. By means of Bragg diffraction, the magnetostatic wave diffracts the guided optical beam and thereby converts a portion of the beam into a second orthogonal polarization mode in response to the RF input signal. The guided optical beam is thereby modulated by the RF input signal. A preferred embodiment is disclosed which can be configured to form a spectrum analyzer, a time integrating correlator, and a space integrating convolver.

21 Claims, 6 Drawing Figures

INTEGRATED OPTICAL SIGNAL PROCESSOR USING DIFFRACTION OF LIGHT BY MAGNETOSTATIC WAVES

BACKGROUND OF THE INVENTION

The present invention relates, in general, to novel optical signal processors, and, more particularly, to novel integrated optical signal processors which make use of the Bragg diffraction of guided light by magnetostatic waves.

A variety of optical signal processing and communications applications could benefit from optical modulation in the 1 to 20 GHz microwave region. Presently used approaches such as direct modulation of semiconductor lasers, traveling-wave electro-optic modulators, and acousto-optic diffraction are generally restricted to a few GHz at best. Traveling-wave electro-optic modulators can, under some circumstances, exceed 10 GHz but cannot generally be operated with a large time-bandwidth product (TBW) in tranverse one-dimensional modulator geometries. On the other hand, acousto-optic deflectors can offer a large time-bandwidth product, but are usually limited to center frequencies below a few GHz. In contrast, magneto-optic modulation by magnetostatic waves (MSW) appears to offer the potential of a large time-bandwidth product directly at microwave signal frequencies of up to 20 GHz or higher.

Bragg diffraction of optical beams by magnetostatic waves has been previously observed in bulk bar and rod ferrite geometries. This phenomenon has seen little further development primarily because the internal magnetic field of a bulk ferrimagnetic material in a uniform applied magnetic field tends to be spatially inhomogeneous due to shape factor demagnetization. This results in large spatial variations in the magnetostatic wave dispersion relationship and can even cause "turning points" which reflect the magnetostatic wave. Thus, the bulk geometry cannot be employed in practical optical signal processing devices.

Recently, thin ferrite films have been developed which exhibit numerous desirable magnetic characteristics such as a uniform internal magnetic field. Such thin films have been used to form bubble memory devices and for electronic magnetostatic wave delay-line devices. The magneto-optic and infrared transparency properties of these thin films have also been exploited to build integrated optical low-frequency modulators and non-reciprocal isolators utilizing optical Faraday rotation controlled by an external magnetic field. The present invention makes use of the desirable characteristics of thin ferrite films to form another type of optical signal processing device.

SUMMARY OF THE INVENTION

Accordingly, one object of the present invention is to provide an integrated optical signal processor device which exploits the magnetic characteristics of thin ferrite films.

Another object is to provide an integrated optical signal processor device which employs a magnetostatic wave propagating in a thin ferrite film to different an optical beam propagating in the same thin film.

Another object is to provide an integrated optical signal processor device capable of impressing 1 to 20 GHz electrical signal information onto optical beams.

Still another object is to provide an integrated optical signal processor device capable of exhibiting large time-bandwidth product modulation of one-dimensional optical wavefronts directly at 1 to 20 GHz or higher signal frequencies.

These and other objects and advantages are provided by an integrated optical signal processor device according to the present invention which includes a thin film of ferrite material forming an optical waveguide. The thin film is adaptable to conduct a guided optical beam therein in a first polarization mode. The device further includes means for generating a magnetostatic wave in the thin film in response to an input electrical signal. The magnetostatic wave diffracts a portion of the guided optical wave proportional to the input electrical signal. The diffracted portion of the beam is coupled into a second polarization mode orthogonal to the first polarization mode. The guided optical beam is thus modulated by the input electrical signal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
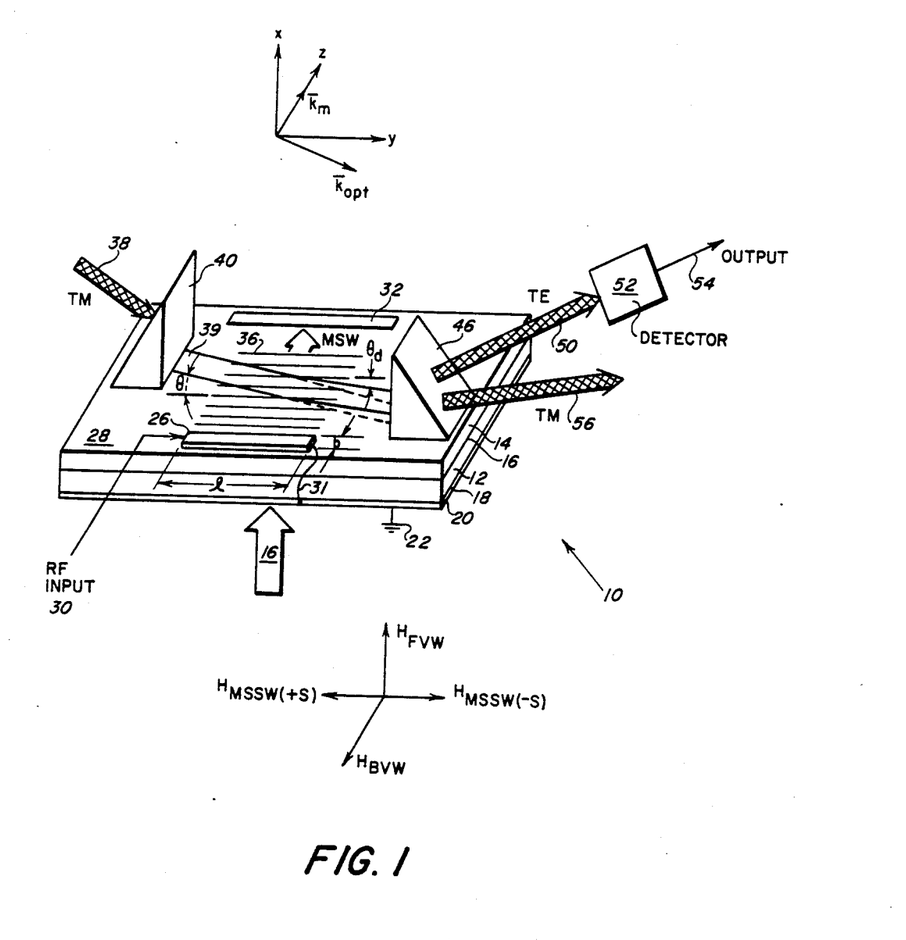
FIG. 1 schematically illustrates an integrated optical modulator device according to a preferred embodiment of the present invention.

Referring now to the drawings, wherein like reference numerals designate identical or corresponding parts throughout the several views, and more particularly to FIG. 1 thereof, a signal processor according to a first preferred embodiment of the present invention is illustrated in the form of an integrated optical modulator device 10. The device 10 includes a substrate 12 of single crystal gadolinium gallium garnet (GGG). A lattice-matched yttrium iron garnet (YIG) ferrite thin film layer 14 approximately 10 μm thick is formed on the upper planar surface 16 of the substrate 12 by means of liquid phase epitaxy in a manner well-known in the art. The GGG crystal substrate 12 is oriented with its (111) axis normal to the upper planar surface 16. The combined substrate 12 and thin film layer 14 typically have a thickness on the order of 1 mm. The lower planar surface 18 of the substrate 12 is coated with a highly conductive metal such as gold or silver to form a ground plane 20. The ground plane 20 is coupled to ground 22 in a well-known manner.

A metallic stripline antenna 26 comprising a metallic layer having a length l and a width b is formed on the upper planar surface 28 of the thin film 14. The metallic layer is made of a good conductor such as gold or silver deposited in a well known manner. An RF input signal 30 having a microwave frequency $\Omega$ is coupled to one end of the antenna 26 is a well-known manner. The other end of the antenna 26 is coupled to the ground plane 20 by means of a conductor 31. The length l of the antenna 26 should be less than one-quarter the electrical wavelength of the RF input signal 30. The bandwidth of the device 10 is inversely proportional to the antenna width b. The antenna width b typically lies in the range of 0.01 to 1.0 mm. A magnetic absorber layer 32 is formed on the upper planar surface 28 of the thin film layer 14 opposite and spaced apart from the antenna 26. The layer 32 is made of a thin metal film or lossy ferrite deposited on the surface 28 in a well-known manner. The absorber layer 32 has a length greater than the length l of the antenna 26. The absorber layer 32 acts to collect and absorb electromagnetic waves excited by the antenna 26 and propagating in the thin film 14.

The antenna 26, when excited by the RF input signal 30, acts to launch an electromagnetic wave in the thin film layer 14. Under the influence of an applied external magnetic bias field $\overline{H}_o$, the electromagnetic wave takes the form of a magnetostatic wave (MSW) which propagates in the thin film 14. As will be discussed in further detail below, the MSW magneto-optically induces a traveling refractive index grating 36 in the thin film layer 14.

An MSW is a microwave electromagnetic wave which propagates in a ferrite biased by an external magnetic field. As such, the MSW is described by Maxwell's equations with a permeability tensor $\overline{\overline{\mu}}$ which can be derived from the gyromagnetic equation of motion $\partial \overline{M}/\partial t = \gamma(\overline{H} \times \overline{M})$ and the relations $\overline{m} = \overline{\overline{x}} \overline{h}$ and $\overline{\overline{\mu}} = \mu_o (\overline{\overline{I}} + \overline{\overline{x}})$. Here $\overline{M} = \overline{M}_o + \overline{m}$ is the intrinsic magnetic moment of the ferrite with $\overline{m}$ and $\overline{M}_o$ as RF and DC components, respectively. $\overline{H} = \overline{H}_o + \overline{h}$ is the magnetic field in the ferrite expressed as the sum of an RF component, $\overline{h}$, and an external applied DC field, $\overline{H}_o$. The magnetic moment of YIG is $4\pi |\overline{M}| = 1750$ Oe and its gyromagnetic ratio $\gamma$ is 2.8 MHz/Oe.

Solving Maxwell's equations with the thin-film boundary conditions results in solutions for the RF fields and for the dispersion relation, i.e., the MSW wavevector magnitude $k_m \equiv |\overline{k}_m|$ as a function of the microwave frequency, $\Omega$, of the RF input signal 30. Four types of solutions are found depending on the relative orientations of $\overline{H}_o$, $\overline{k}_m$, and the YIG surface normal, $\hat{n}$. There are two dielectric-waveguide-like waves called forward volume waves (FVW) and backward volume waves (BVW, $\partial k_m/\partial \Omega < 0$), and two types of magnetostatic surface waves (MSSW). The MSSW decay in intensity away from the YIG surfaces and are distinguished by the parameter $S = \pm 1$, where $\overline{k}_m$ is in the direction $S(\overline{H}_o \times \hat{n})$.

In FIG. 1, the vectors $\overline{H}_{FVW}$, $\overline{H}_{BVW}$, $\overline{H}_{MSSW(+S)}$, and $\overline{H}_{MSSW(-S)}$ illustrate the four magnetic field bias directions required to produce each of the four types of MSW in the ferrite thin film 14. The RF insertion loss for the $S = +1$ MSSW is generally less than for FVW or BVW, which are in turn more efficiently excited than the $S = -1$ MSSW. The MSW solution for $\overline{m}(=\overline{\overline{x}}\overline{h})$ generally corresponds to a traveling circular or elliptical precession of $\overline{M}$ about the bias field direction $\overline{H}_o$. Most practical applications are characterized by an MSW wavelength much shorter than that of the RF field external to the ferrite, i.e., $2\pi/k_m << \Omega/c$. The RF exciting fields thus appear uniform to the MSW, which then obeys Maxwell's equations in the quasistatic limit $(D=0)$; hence the name magnetostatic wave. The dispersion relations allow $k_m$ to range from zero to infinity as $\Omega$ varies over the bounded ranges $\gamma[H_o(H_o+4\pi M)]^{\frac{1}{2}} < \Omega < \gamma(H_o+4\pi M)$ for MSSW and $\gamma H_o < \Omega < \gamma[H_o(H_o+4\pi M)]^{\frac{1}{2}}$ for FVW and BVW.

The modulator 10 of FIG. 1 utilizes the MSW 36 traveling in the thin film layer 14 to diffract by means of Bragg diffraction a guided optical beam propagating at a transverse angle with respect to the magnetostatic wave in the thin film layer 14. An optical input beam 38 in the TM polarization mode from a laser (not illustrated) is introduced into the thin film layer 14 by means of a prism 40 optically contacted with the upper planar surface 28 of the thin film layer 14. The YIG material used to form the thin-film layer 14 is capable of supporting many different optical propagation modes. The optical input beam 38 should be oriented with respect to the prism 40 so as to excite one of the lower order modes. The launching of such guided optical beams in thin film layers is well-known in the art. For this embodiment, the magnetic field vector $\overline{H}_o$ is oriented normal to the planar surface 28 (X axis direction) and thus produces a forward volume wave MSW in the Z direction when the antenna 26 is excited by the RF input signal 30. Alternatively, the vector $\overline{H}_o$ can be directed in the Z direction to produce a backward volume wave MSW.

As will be discussed in detail below, due to the interaction between the TM input guided optical wave and the MSW, a portion of the TM mode wave is coupled into the orthogonal TE mode while the remaining portion of the guided optical wave remains in the TM mode. The amplitude of the guided optical beam coupled into the TE mode is proportional to the input signal 30 which excited the MSW. Thus the guided optical wave is modulated by the MSW.

In FIG. 1, the guided optical wave is coupled out of the thin film layer 14 by means of a second prism 46 optically contacted with the upper surface 28 of the thin film layer 14. The prism 46 and the earlier discussed prism 40 should both be formed of a material, such as Rutile, having an index of refraction higher than that of the YIG thin film at the optical wavelength of interest.

The TE mode optical output beam 50 from the prism 46 may be detected by a photo-detector 52. The electrical output signal 54 of the detector 52 is proportional to the intensity of the TE mode beam 50 and thus represents the TM mode input beam 38 as modulated by the RF input signal 30. Alternatively, the TE mode output beam 50 may be optically transmitted to a remote location or further optically processed as desired. The optical birefringence of the prism will cause the unmodulated TM mode output of the prism 46 to be spatially displaced from the TE output beam 50, as represented by the TM mode output beam 56. This beam may also be detected and/or processed as desired.

Figure 2A:
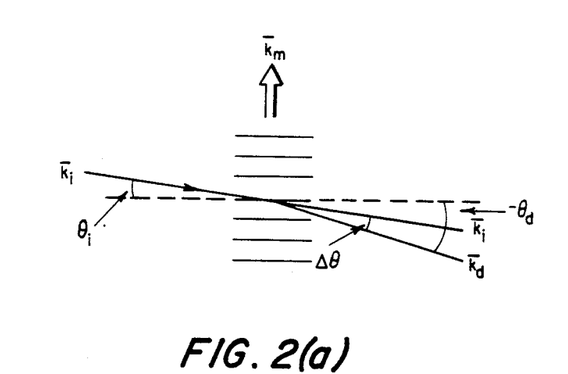
FIG. 2(a) schematically illustrates the angular relationship between the MSW wavevector $\bar{k}_m$ and the input guided optical wavevector for the embodiment shown in FIG. 1.
Figure 2B:
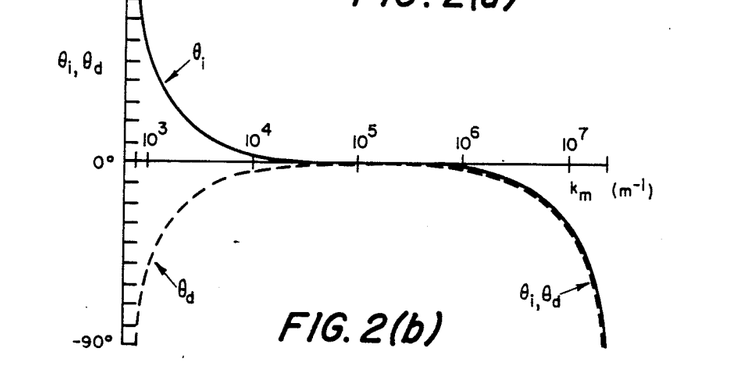
FIG. 2(b) is a plot of the angles $\theta_i$ and $\theta_d$ shown in FIG. 2(a) as a function of the magnitude of the MSW wavevector $\bar{k}_m$.
Figure 2C:
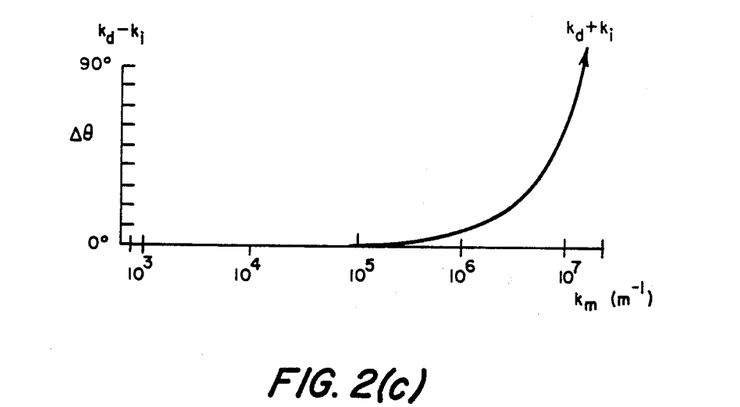
FIG. 2(c) is a plot of the difference angle $\Delta\theta$ as shown in FIG. 2(a) as a function of the magnitude of the MSW wavevector $\bar{k}_m$.

FIG. 2(a) schematically illustrates the angular relationship between the MSW wavevector $\overline{k}_m$ and the input guided optical wavevector $\overline{k}_i$ for the general case. Here $\overline{k}_d$ is the diffracted optical wavevector, $\theta_i$ is the angle the input optical vector makes with the traveling refractive index grating (dashed line) of the MSW, $\theta_d$ is the angle the diffracted optical wavevector $\bar{k}_d$ makes with the refractive index grating, and $\Delta\theta$ is the difference between $\theta_d$ and $\theta_i$. FIG. 2(b) is a plot of the relationships between the incident and diffraction angles $\theta_i$ and $\theta_d$, respectively, as a function of the magnitude of the MSW wavevector $\bar{k}_m$ as required to satisfy the Bragg condition $\bar{k}_d = \bar{k}_i \pm \bar{k}_m$. Similarly, FIG. 2(c) is a plot of the difference angle $\Delta\theta$ as a function of the magnitude of $\bar{k}_m$.

The input beam 38 in FIG. 1 is angled such that the guided optical wave 39 propagates at an angle $\theta_i$ with respect to the traveling refractive index grating 36 of the MSW. As a result of the interaction with the MSW, the wave 39 is diffracted at an angle $\theta_d$ with respect to the refractive index grating. Given the magnitude of the MSW vector and the angle $\theta_i$, the angle $\theta_d$ may be predicted from FIG. 2(b). The diffracted guided optical wave is coupled out of the thin film 14 by means of the prism 46. Due to the angles $\theta_i$ and $\theta_d$ and the spacing between the prisms 40 and 46, the prism 46 should be offset somewhat from the prism 40 in the Z direction as should be apparent to the skilled practitioner.

Figure 3:
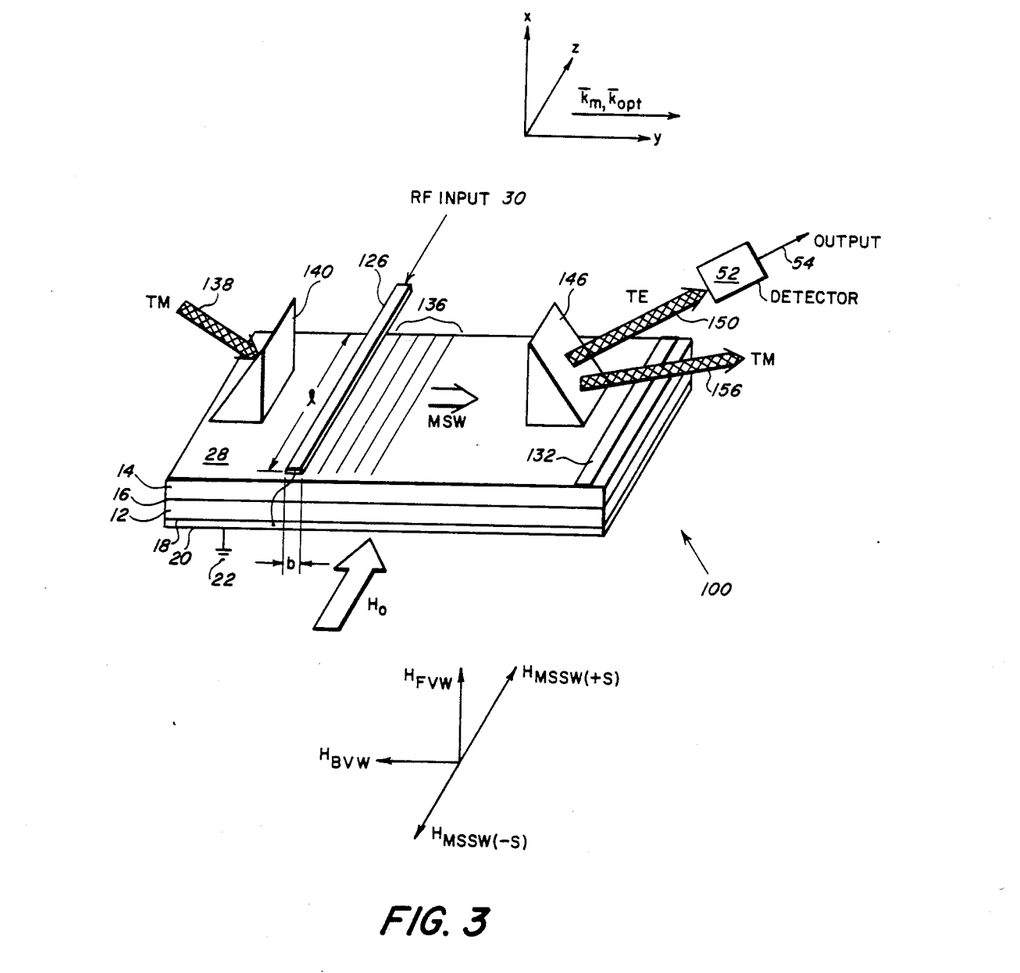
FIG. 3 schematically illustrates an integrated optical modulator device according to another preferred embodiment of the present invention.

FIG. 3 illustrates an integrated optical modulator device 100 according to a second preferred embodiment of the present invention. The device 100 is conceptually similar to the modulator device 10 of FIG. 1; however, in the device 100 the MSW propagates in the same direction (or opposite direction) to the guided optical wave. In this embodiment, the substrate 12 and the thin film layer 14 are as described above with respect to FIG. 1. A metallic stripline antenna 126 and an opposed absorber layer 132 are located on the upper surface 28 of the thin film 14 in a manner similar to the antenna 26 and absorber 32 shown in FIG. 1. The antenna 126 has a length l and a width b as described above with respect to FIG. 1. For this embodiment, the bias field $\bar{H}_o$ is oriented in the $+Z$ direction to excite the more efficient $S=+1$ MSSW. Alternatively, the $S=-1$ MSSW could also be excited by reversing the direction of $\bar{H}_o$.

Positioned on top of the surface 28 and optically contacted therewith are prisms 140 and 146 which are essentially similar to the prisms 40 and 46 as shown in FIG. 1. An input laser beam 138 in the TM polarization is directed onto the prism 140 at an appropriate angle to excite a lower order mode guided optical wave in the thin film layer 14. Due to the interaction between the guided optical wave and the MSW, the diffracted portion of the guided wave is modulated and converted from the TM polarization mode to the TE polarization mode. The TE mode wave is coupled out of the thin film 14 by the prism 146 to form the TE mode output beam 150 which may be transmitted as described above or which may be detected by a photodetector 52 as described above with respect to FIG. 1. Similarly, the unmodulated TM mode portion of the guided wave is converted by the prism 146 to a TM mode output beam 156 which is spatially displaced from the beam 150. The beam 156 may be processed or detected as desired.

For the embodiment of FIG. 3, the MSSW RF $\bar{h}$ field in the thin film layer 14 can be written as:

$$\bar{h} = h_x\hat{x} + h_y\hat{y} + h_z\hat{z} \quad (1)$$

where:

$$h_x = H_t\left(\frac{a_1 a_2}{a_2 - a_1}\right)\left[\frac{e^{-k_m x}}{a_1} - \frac{e^{k_m x}}{a_2}\right] e^{-i(\Omega t - k_m sy)} \quad (2)$$

$$h_y = ish_x \quad (3)$$
$$h_z = 0 \quad (4)$$

Here $a_1 = 2 + \gamma 4\pi M/(s\Omega + \gamma H_o)$, $a_2 = \gamma 4\pi M/(s\Omega - \gamma H_o)$, and $0 < x < d$ corresponds to the thin film layer. Since very thin YIG films (d<15 μm) are generally employed, $k_m d << 1$ is a valid approximation and Equation (2) becomes:

$$h_x = H_t \exp(-i(\Omega t - k_m sy)) \quad (5)$$

It should be noted that $H_t$ is the component of $\bar{H}$ perpendicular to $\bar{H}_o$.

For either modulator 10 or 100, the optical refractive index changes due to the magneto-optic effect in a ferrite material are a function of the magnetization $\bar{M}$ rather than the $\bar{H}$ field. For the geometry of FIG. 3, $$\bar{M} = M_o\hat{Z} + m_y\hat{Y} + m_x\hat{x} \quad (6)$$

Using Equations (1) through (5) and $m = xh$, the real part of $\bar{m}$ can be written:

$$m_x' = M_t \cos(\Omega t - k_m sy) \quad (7)$$

$$m_y' = M_t \sin(\Omega t - k_m sy) \quad (8)$$

where:

$$M_t = -\left(\frac{\gamma M}{s\Omega - \gamma H}\right) H_t = M\sin\theta_m \quad (9)$$

Here $\theta_m$ is the precession angle of $\bar{M}$. The corresponding optical permittivity tensor $\bar{\bar{\epsilon}}$ can be written:

$$\bar{\bar{\epsilon}}(t) = \epsilon_o \begin{pmatrix} \epsilon & ifM_o & -ifm_y' \\ -ifM_o & \epsilon & ifm_x' \\ ifm_y' & -ifm_x' & \epsilon_z \end{pmatrix} \quad (10)$$

where $\epsilon_o$ is the permittivity of free space, $f \approx 2\epsilon\phi_F/k_{opt}M$, $\phi_F$ is the Faraday rotation constant in units of degrees per centimeter, and $k_{opt}$ is the magnitude of the optical wavevector.

In general, the component of the RF magnetization along the direction of optical propagation results in a traveling refractive index grating which can diffract between orthogonally polarized optical modes. For example, the $\epsilon_{13}$ and $\epsilon_{31}$ optical permittivity elements of Equation (10) will induce coupling between the TE and TM waveguide modes of an optical wave with a component of travel ($\bar{k}_{opt}$) along the Y axis direction in the configuration of FIG. 3. Thus, due to the interaction between the TM input guided optical wave and the MSW, a portion of the TM mode wave is coupled into the orthogonal TE mode while the remaining portion of the guided optical wave remains in the TM mode. The amplitude of the guided optical beam coupled into the TE mode is proportional to the input signal 30 which excites the MSW. Thus the guided optical wave is modulated by the MSW. The optical frequency $\omega_d$ of the diffracted beam is doppler shifted by the MSW to $\omega_d = \omega + \Omega$ when $\bar{k}_d = \bar{k}_i + \bar{k}_m$ holds or $\omega_d = \omega - \Omega$ when $\bar{k}_d = \bar{k}_i - \bar{k}_m$.

The growth of the converted mode intensity $I_d$ with distance y follows from coupled mode theory as $$\frac{I_d}{I_o} = \frac{4k^2}{4k^2 + \Delta\beta^2} \text{SIN}^2 [\tfrac{1}{2}y \sqrt{4k^2 + \Delta\beta^2}] \quad (11)$$

where:

$$\Delta\beta = \beta_E - \beta_M - k_m \quad (12)$$

and $$k \simeq \frac{|\epsilon_{31}|k_o \sqrt{\epsilon}}{2\epsilon_o \epsilon} \simeq \frac{fm_y'k_o}{2n} \simeq S\phi_F \text{SIN}\theta_m \quad (13)$$

In each of the devices 10 and 100 illustrated respectively in FIGS. 1 and 3, a TM polarization mode optical input beam has been converted to an orthogonal TE mode output beam due to the interaction with the MSW in the thin film layer. Alternatively, a TE mode laser beam can be used as an input. In this case, the modulated output beam will be in the orthogonal TM mode. The spatial positions of the input and output beams with regard to the input and output prisms will, of course, change depending on the polarization modes of the various beams.

In the devices 10 and 100 shown respectively in FIGS. 1 and 3, a ground plane for the stripline antenna has been formed by depositing a metallic layer 20 on the lower planar surface 18 of the substrate 12. Alternatively, a ground plane could be formed by depositing a metallic layer on the upper planar surface of an alumina plate (not illustrated) of several mils thickness. The uncoated lower surface of the alumina plate could than be positioned above the upper planar surface 28 of the thin film layer 14 such that the antenna metallization and the magnetic absorber layer are sandwiched between the alumina plate and the thin film layer and are in contact with the plate. In this alternative configuration, the thickness of the alumina plate could be adjusted to optimize the ground plane effect. It should be appreciated that appropriate openings must be formed in the alumina plate to provide clearance for the two prisms which contact the upper surface 28 of the thin film layer. As yet another alternative, the antenna metalization and the magnetic absorber layer could be deposited on the lower surface of the alumina plate with the upper surface of the plate being coated with the ground plane metallization. The alumina plate is then positioned above the upper planar surface 28 of the thin film layer 14 such that the antenna metallization and the magnetic absorber are in contact with the upper planer surface 28.

Modulator 100 in FIG. 3 acts as a tunable narrowband optical filter when the input optical wavelength is varied. Also, the modulator 100 serves as a sensitive magnetometer due to the dependence of $k_m$ on the external magnetic field. Modulator 100 performs as an optical isolator due to the intrinsically non-reciprocal nature of the mode conversion induced here by Faraday rotation.

Figure 4:
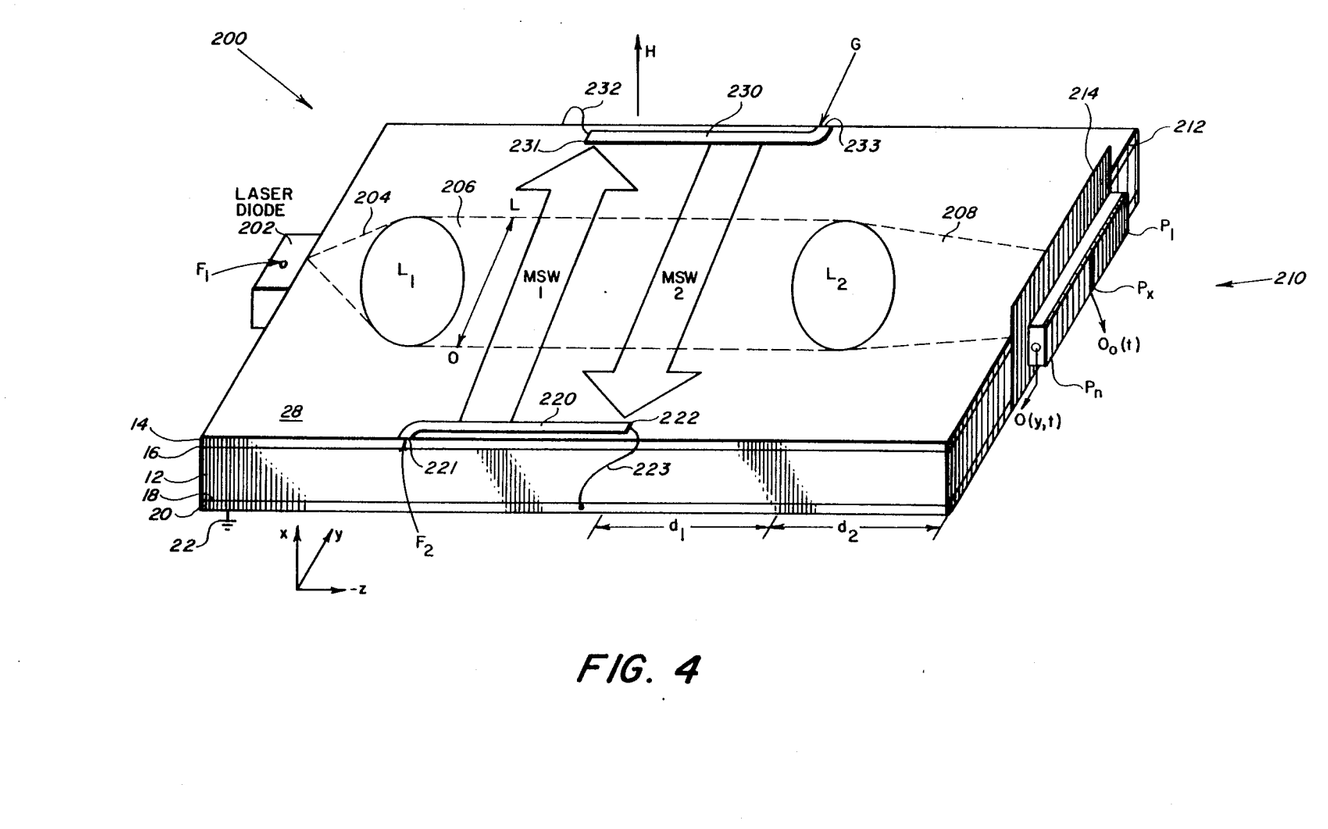
FIG 4 schematically illustrates an integrated optical signal processor device according to a preferred embodiment of the present invention.

Referring now to FIG. 4, an optical signal processor device 200 is illustrated according to another preferred embodiment of the present invention. In the signal processor 200, the substrate 12, the thin film layer 14, and the ground plane metallization 20 are the same as those described above with respect to FIG. 1 and 3. A laser diode 202 is coupled to propagate a TM polarization mode guided optical wave 204 in the thin film layer 14. The intensity of the output of the laser diode 202 and thus the intensity of the guided optical wave 204 is controlled by an input signal $F_1$ applied to the electrical input of the diode 202. The guided optical wave 204 is collimated into a beam 206 by a lens $L_1$ formed on the upper surface 28 of the thin film layer 14. The lens $L_1$ may take the form of a Luneberg lens formed by the evaporative deposition of a several micron thick layer of $As_2S_3$ on the surface 28. The lens has an aperture of width L and should be approximately circular in shape. Other appropriate lenses such as Fresnel and geodesic lenses could also be used. Such lenses are all well known in the art and thus will not be described in further detail herein.

The collimated beam 206 is subsequently formed into a bean 208 by means of a second lens $L_2$ onto a linear array 210 of photodetectors $P_1$ through $P_n$ coupled to detect light emanating from the edge 212 of the thin film layer 14. The lens $L_2$ should be of a design essentially similar to that of lens $L_1$. The center of lens $L_2$ is located a distance $d_2$ from the photodetector array 210. The individual photodetector elements $P_1$ through $P_n$ are arranged along the Y axial direction and thus may spatially detect the intensity of the light across the width of the beam 208. The electrical outputs of the photodetectors may be read out serially as the output $O(y,t)$ or the individual photodetector outputs may be read out in parallel (not illustrated). $O_o(t)$ is the electrical output of a photodetector element $P_x$ which is axially aligned with the lenses $L_1$ and $L_2$. Positioned between the photodetector array 210 and the edge 212 of the thin film layer 14 is a polarizer film 214 which is oriented to pass only light energy in the TE polarization mode. The photodetector array 210 thus only receives light which has been acted upon by the signal processor 200 as will be discussed further below.

An antenna metalization 220 extending in the Z direction is positioned along the surface 28 of the thin film layer 14 between lenses $L_1$ and $L_2$. The antenna 220 is coupled at an end 221 to receive an RF input signal $F_2$. The opposite end 222 of the antenna 220 is coupled to the ground plane by means of a conductor 223. The antenna 220 has a length l and a width b and is similar to the antennas described above with respect to FIGS. 1 and 3. The grounded end 222 of the antenna 220 is located a distance $d_1$ from the center of the lens $L_2$. The device 200 is subjected to a magnetic field $\bar{H}$ directed in the X direction. The signal $F_2$ thus produces forward volume wave MSW vector (MSW 1) directed in the Y direction in a manner as described in detail above.

The signal processor device 200 may be used as a spectrum analyser by forming the device such that the distance $d_2$ equals one focal length of the lens $L_2$. The signal to be analyzed is applied to the antenna 220 such that $F_2 = f_2(t)$ while the diode 202 is driven by a constant amplitude signal $F_1$. In this configuration, the collimated constant amplitude light signal 206 is amplitude modulated by the MSW signal $f_2(t - y/V_g)$ where $V_g$ is the MSW group velocity. The lens $L_2$ produces the Fourier transform of $f_2(y)$ at the photodetector array 210 which in turn produces an output signal as follows:

$$O(u,t) = \left| \int_0^L f_2(t - y/V_g) e^{-juy} dy \right|^2 \quad (14)$$

where u is a spatial variable parallel to y in the plane of the detector 210.

Similarly, the device 200 may be used to form a time integrating correlator by adjusting the dimensions $d_1$ and $d_2$ such that:

$$\frac{1}{d_1} + \frac{1}{d_2} = \frac{1}{f} \quad (15)$$

where f is the focal length of the lens $L_2$. In this configuration, the intensity of the output of the diode 202 is modulated by a first input signal $F_1 = f_1(t)$. A second input $F_2 = f_2(t)$ plus a constant bias signal is applied to the antenna 220 such that the collimated beam 206 following the lens $L_1$ is intensity modulated by the MSW signal $f_2(t - y/V_g)$. The modulated optical signal is imaged onto the detector array 210 by the lens $L_2$. The detector array integrates the light intensity incident thereon over a time period T to produce a signal term in the detector output signal O(y,t) which is proportional to the correlation:

$$\int_0^T f_1(t) f_2(t - y/V_g) dt \quad (16)$$

Additionally, with some modifications the device 200 may be utilized to form a space integrating convolver. For this purpose, a second antenna metalization 230 extending in the Z direction is formed on the upper surface 28 of the thin film layer 14. The antenna 230 is positioned opposite and parallel to the antenna 220 between the lenses $L_1$ and $L_2$. One end 231 of the antenna 230 is coupled via a conductor 232 to the ground plane. When the opposite end 233 is excited by an RF input signal G under the influence of the magnetic field H, the antenna 230 excites a second MSW (MSW 2) which counter-propagates in the thin film with the vector MSW 1 of the antenna 220. The distance $d_2$ is made equal to the focal length of the lens $L_2$. In this configuration the laser diode is driven by a constant signal $F_1$, the antenna 220 is driven by an input signal $F_2 = f_2(t)$, and the antenna 230 is driven by a signal $G = g(t)$. The collimated beam 206 is modulated by the product of MSW 1 and MSW 2. The lens $L_2$ performs a spatial integration of the modulated optical signal onto the axially aligned single photodetector element $P_x$ which produces the output signal $O_o(t)$ proportional to the convolution:

$$\int_0^L g(t + y/V_g) f_2(t - y/V_g) dy \quad (17)$$

The MSW integrated optical devices disclosed herein can directly process signals with center frequencies of 20 GHz or higher. The bandwidth of these devices is, however, significantly less, being limited by the Bragg phase-matching conditions, by the passband of the MSW exciting antenna, and by the intrinsic MSW limits for a given magnetic bias field. The Bragg-limited bandwidth can be broadened by employing multiple or phased-array transducer structures similar to those used for surface acoustic wave acoustooptic modulators. The passband of the MSW antenna radiation impedance can be increased by using impedance matching networks, thin stripline antennas, and thick ferrite films. Additionally, the intrinsic MSW limits may be broadened by using non-uniform magnetic bias fields. For example, in FIG. 4 an increase in the magnetic field from left to right along the Z axis may alleviate both the MSW and Bragg limitations. The MSW dispersion relation, radiation impedance, and frequency limits all shift to higher frequency with an increase in the magnetic field. The frequency shift of the radiation impedance causes signal components at higher frequencies to be launched further down the stripline antenna to the region where the field is larger. Using the antenna 220, the position of the MSW traversal of the collimated beam of FIG. 4 thus shifts to the right, but $k_m$ can be held near its optimal Bragg value by using the shift of the MSW dispersion relation with field to counteract the increase in frequency.

By exploiting the dependence of the dispersion relation on the magnetic bias field, the present inventors believe it may be possible to build devices as disclosed herein with bandwidths of greater than 1 GHz which can be operated over a center frequency range of greater than 20 GHz by merely adjusting the bias field.

Additional descriptive matter regarding the present invention is presented in A. D. Fisher et al., "Optical Guided-Wave Interactions with Magnetostatic waves at Microwave Frequencies", Applied Physics Letters 41(9), 1 Nov. 1982; and in A. D. Fisher et al., "Diffraction of Guided Optical Waves in Magnetostatic Wave Delay Lines", Proceedings of 1982 IEEE Ultrasonic Symposium, pp. 541–546, November 1982, the contents of these articles are hereby incorporated herein by reference.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An integrated optical signal processor device comprising:
    a thin film of ferrite material forming an optical waveguide, said thin film being adaptable to conduct a guided optical beam in a first polarization mode; and
    means for generating a magnetostatic wave in said thin film in response to an input electrical signal, said magnetostatic wave diffracting a portion of said guided optical beam proportional to said input electrical signal, said diffracted portion of said guided optical beam being coupled into a second polarization mode orthogonal to said first polarization mode, said optical beam angled with respect to said magnetostatic wave to achieve phase matching of the optical beam and the magnetostatic wave; whereby said guided optical beam is modulated by said input electrical signal.

2. The integrated optical signal processor device as recited in claim 1, wherein said ferrite material comprises yttrium iron garnet, said thin film being formed on a surface of a substrate.

3. The integrated optical signal processor device as recited in claim 2, wherein said substrate comprises gadolinium gallium garnet.

4. The integrated optical signal processor device as recited in claim 1, wherein the wavevector of said magnetostatic wave is oriented in the direction of propagation of said guided optical beam such that said magnetostatic wave and said guided optical beam co-propagate in said thin film.

5. The integrated optical signal processor device as recited in claim 1, wherein the wavevector of said magnetostatic wave is oriented in a direction opposite to the direction of propagation of said guided optical beam such that said magnetostatic wave and said guided optical beam counter-propagate in said thin film.

6. The integrated optical signal processor device as recited in claim 1, wherein the wavevector of said magnetostatic wave is oriented in a direction having a component of propagation transverse to the direction of propagation of said guided optical beam in said thin film.

7. The integrated optical signal processor device as recited in claim 1, wherein said means for generating comprises:
a stripline antenna formed on said thin film, said antenna being adaptable to receive said input electrical signal, said antenna exciting said magnetostatic wave in said thin film in response to said input electrical signal when said thin film is subjected to a bias magnetic field.

8. The integrated optical signal processor device as recited in claim 1, which further comprises:
means for receiving an optical beam and for coupling said optical beam into said thin film to form said guided optical beam; and
means for coupling said diffracted portion of said guided optical beam out of said thin film.

9. The integrated optical signal processor device as recited in claim 8, wherein:
said means for receiving said optical beam comprises a first prism optically coupled to said thin film, said first prism coupled to receive said optical beam and to direct said optical beam into said thin film to form said guided optical beam; and
said means for coupling said diffracted portion of said guided optical beam comprises a second prism optically coupled to said thin film, said second prism receiving said diffracted portion of said guided optical beam and converting said diffracted portion to an output optical beam.

10. An integrated optical signal processor device comprising:
a thin film of ferrite material, said thin film forming an optical waveguide, said thin film conducting a collimated optical beam in a first polarization mode;
means for generating a first magnetostatic wave in said thin film in response to a first electrical signal, said first magnetostatic wave interacting with said collimated optical beam to convert a first portion of said beam into a second polarization mode orthogonal to said first polarization mode in response to said first electrical signal, said optical beam angled with respect to said magnetostatic wave to achieve phase matching of the optical beam and the magnetostatic wave; and
means for detecting the intensity of said first portion of said beam and for producing an output electrical signal representative of said collimated optical beam modulated by said first electrical signal.

11. The integrated optical signal processor device as recited in claim 10, wherein said detecting means comprises:
means for spatially detecting the intensity of light signals incident thereon; and
means for imaging said first portion of said beam into the optical input of said spatially detecting means;
said spatially detecting means producing an output signal representative of the spectral analysis of said first electrical signal.

12. The integrated optical signal processor device as recited in claim 10, which further comprises means for modulating the intensity of said collimated optical bean in response to a second electrical signal, said detecting means comprising:
means for spatially detecting the intensity of light signals incident thereon; and
means for imaging said first portion of said beam onto the optical input of said spatially detecting means;
said spatially detecting means producing an output signal representative of the correlation of said first and second electrical signals.

13. The integrated optical signal processor device as recited in claim 10, which further comprises:
means for generating a second magnetostatic wave in said thin film in response to a second electrical signal, said second magnetostatic wave interacting with said first magnetostatic wave and said collimated optical beam such that said first portion of said collimated optical beam converted into said second polarization mode is converted in response to both said first and second electrical signals;
said output of said detecting means being representative of said collimated optical beam modulated by the product of said first and second electrical signals.

14. The integrated optical signal processor device as recited in claim 13, which further comprises:
means for spatially integrating said first portion of said beam onto said detecting means;
said output of said detecting means being representative of the convolution of said first and second electrical signals.

15. The integrated optical signal processor device as recited in claim 13, wherein:
the wavevector of said first magnetostatic wave is oriented in a first direction transverse to the direction of propagation of said collimated optical beam in said thin film; and
the wavevector of said second magnetostatic wave is oriented in a second direction transverse to the direction of propagation of said collimated optical beam in said thin film.

16. The integrated optical signal processor device as recited in claim 13, wherein:
said means for generating said first magnetostatic wave includes a first stripline antenna formed on said thin film, said first antenna being adaptable to receive said first electrical signal;
said means for generating said second magnetostatic wave includes a second stripline antenna formed on said thin film, said second antenna being adaptable to receive said second electrical signal; and
said first antenna exciting said first magnetostatic wave in said thin film in response to said first electrical signal and said second antenna exciting said second magnetostatic wave in said thin film in response to said second electrical signal when said thin film is subjected to a bias magnetic field.

17. The integrated optical signal processor device as recited in claim 10, wherein said ferrite material comprises yttium iron garnet, said thin film being formed on a surface of a substrate.

18. The integrated optical signal processor device as recited in claim 17, wherein said substrate comprises gadolinium gallium garnet.

19. The integrated optical signal processor device as recited in claim 10, wherein the wavevector of said first magnetostatic wave is oriented in a direction transverse to the direction of propagation of said collimated optical beam in said thin film.

20. The integrated optical signal processor device as recited in claim 10, wherein said means for generating comprises:
a stripline antenna formed on said thin film, said antenna being adaptable to receive said first electrical signal, said antenna exciting said first magnetostatic wave in said thin film in response to said first electrical signal when said thin film is subjected to a bias magnetic field.

21. An integrated optical signal processor device comprising:
a thin film of ferrite material forming an optical waveguide, said thin film being adaptable to conduct a guided optical beam in a first polarization mode; and
an optical beam in a first polarization mode propagating in said thin film ferrite material;
means for generating a magnetostatic wave in said thin film in response to an input electrical signal, said magnetostatic wave diffracting a portion of said guided optical beam proportional to said input electrical signal, said diffracted portion of said guided optical beam being coupled into a second polarization mode orthogonal to said first polarization mode, said optical beam angled with respect to said magnetostatic wave to achieve phase matching of the optical beam and the magnetostatic wave;
whereby said guided optical beam is modulated by said input electrical signal.

* * * * *